United States Patent [19]

Uno et al.

[11] 4,135,795

[45] Jan. 23, 1979

[54] DIGITAL INDICATOR DEVICE FOR INDICATING PHOTOGRAPHING EXPOSURE VALUES IN THE FORM OF DIGITS

[75] Inventors: Naoyuki Uno, Urawa; Tetsuji Shono, Ranzan; Fumio Urano, Omiya; Masahiro Kawasaki, Tokyo; Katsuhiko Nomura, Kawagoe, all of Japan

[73] Assignee: Asahi Kogaku Kogyo Kabushiki Kaisha, Tokyo, Japan

[21] Appl. No.: 814,944

[22] Filed: Jul. 12, 1977

Related U.S. Application Data

[63] Continuation-in-part of Ser. No. 633,998, Nov. 20, 1975, abandoned.

[30] Foreign Application Priority Data

Nov. 22, 1974 [JP] Japan .......................... 49-141766[U]

[51] Int. Cl.$^2$ ............................................. G03B 17/20
[52] U.S. Cl. .................................. 354/23 D; 354/53; 354/60 L
[58] Field of Search ...................... 354/23 D, 53, 60 L; 356/223

[56] References Cited

U.S. PATENT DOCUMENTS 3,909,137  9/1975  Kisanuki .......................... 354/23 D Primary Examiner—Russell E. Adams
Attorney, Agent, or Firm—Sughrue, Rothwell, Mion, Zinn and Macpeak

[57] ABSTRACT

Very precise indications of the Apex indication values in a camera are displayed through the viewfinder. The nominal value is displayed numerically and further indications are provided to display fractional parts of one step of a nominal Apex indication value.

7 Claims, 5 Drawing Figures

DIGITAL INDICATOR DEVICE FOR INDICATING PHOTOGRAPHING EXPOSURE VALUES IN THE FORM OF DIGITS

RELATED APPLICATIONS

This application is a Continuation-In-Part of application Ser. No. 633,998, filed Nov. 20, 1975, now abandoned.

BACKGROUND OF THE INVENTION

This invention relates to a digital indicator device for displaying the Apex indication exposure values. The indicator is adapted to provide an indication of every step and fractions of a step.

The Apex indication values are related to one another by the well known Apex indication equation:

$$E_v = B_v + S_v = A_v + T_v \tag{1}$$

where;

$B_v$ is the Apex indication value of brightness;
$S_v$ is the Apex indication value of film sensitivity;
$A_v$ is the Apex indication value of aperture opening;
$T_v$ is the Apex indication value of shutter speed; and
$E_v$ is the Apex indication exposure value.

It is quite common for cameras to display the $A_v$ or $T_v$ values by means of a meter. Such a display is an analog indication of these values. It is less common but also known to display the $E_v$ values by a meter. More recently, digital display devices have been used to digitally indicate to the camera user, the values $A_v$, $T_v$, and/or $E_v$. While such displays are very useful, they do have the disadvantage of not being capable of indicating values intermediate two nominal values.

Some such systems use one step for every $\pm 1$ $E_v$, $A_v$ or $T_v$, and therefore are not high precision systems, whereas in other systems, in which illuminant members (electric lamps or the like) are aligned along the frame of a finder field to read numerical values on a character plate fixedly mounted corresponding in position to illuminant members, precise indication is not possible because digital readout is not provided.

In the Kisanuki U.S. Pat. No. 3,909,137, a very complex system, using analog to digital converters with digital to analog feedback, is described for providing a digital indication of the steps of a specific combination of Apex indication values plus an indication of fractional parts of one step of the specific combination of values. The value specifically displayed in the Kisanuki patent is the value $B_v - T_v$, which the patent refers to generally as the exposure value. However, the "exposure value" of the Kisanuki patent is not the exposure value $E_v$ which equals $B_v + S_v$ and $A_v + T_v$.

SUMMARY OF THE INVENTION

The present invention eliminates the disadvantages noted above with respect to prior art and provides a simplified indication system which is capable of digitally displaying immediately nominal values heretofore customarily used for Apex indication values plus digital indications of fractions of a nominal value. The Apex indication values which can be displayed by the invention are $E_v$, $B_v$, $S_v$, $T_v$ and $A_v$. Typically, $S_v$ would not be displayed in this manner because it remains constant for a given film. Also, it is not generally useful to the camera user to display the values $B_v$. However, the values $E_v$, $T_v$ and $A_v$ are particularly useful to the camera user when trying to obtain the optimum exposure characteristics for photographing a given scene.

It is well known in the art that the Apex exposure value $E_v$ is customarily described as $B_v$ when $S_v = 5$. The typical nominal values for the aperture or diaphragm are, for example, 1, 2 ... 16. The typical nominal values for the shutter speed are, for example, 1, ½, ¼, ⅛ ... 1/1000. The present invention not only displays these values, but also displays fractions of these values. For convenience sake, the numerical values corresponding to the specific Apex indication values $E_v$, $B_v$, $T_v$, $S_v$ and $A_v$ are referred to herein as exposure values.

DETAILED DESCRIPTION OF THE INVENTION

Figure 1:
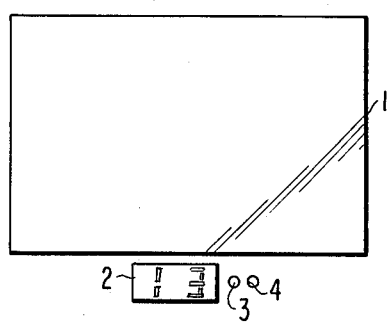
FIG. 1 is a front view of the relation between the scene window and an exposure value indicator as seen when looking in the viewfinder of a camera incorporating the present invention.

A preferred embodiment according to the invention will now be described. FIG. 1 illustrates one example in which the diaphragm value is indicated in the form of digits with the precision of ⅓ $A_v$. In FIG. 1, the reference number 1 designates a finder frame, 2 a digital main indication member, and 3 and 4 auxiliary indication members. The nominal values are indicated by the main indication member, and if the value to be indicated is 13⅓, "13" is indicated by the main indication member 2 and the ⅓ is indicated by illumination of the auxiliary indication member, 3. On the other hand, if the exposure value (in this case the diaphrgam value) is 13⅔, "13" is indicated by the main indication member 2, and ⅔ is indicated by illumination of the auxiliary indication members 3 and 4.

Figure 2:
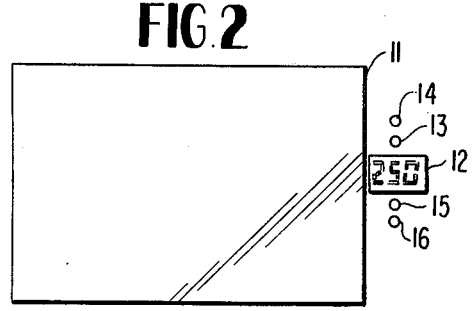
FIG. 2 shows a slight variation of the arrangement shown in FIG. 1.

FIG. 2 illustrates an embodiment in which the shutter speed indication is provided with the precision of ⅓ $T_v$. The reference number 11 designates a finder frame, 12 a digital main indication member, and auxiliary indication members 13, 14, 15, 16.

If the value to be indicated is 1/250, "250" is indicated by the digital main indication member 12. If the value is one third of the way towards the next nominal shutter speed value, (on the EV scale), i.e., 1/500, "250" is indicated by member 12 and the auxiliary indication member 13 is also illuminated. If the value is towards 1/500 by ⅔ $T_v$, the auxiliary indication members 13 and 14 are illuminated.

The auxiliary indication members 15 and 16, positioned below the main indication member 12, are provided to indicate values which are ⅓ $T_v$ and ⅔ $T_v$ below the value indicated by the main indication member 12. For example, if the value is ⅓ $T_v$ towards 1/125, the auxiliary indication member 15 will be illuminated, and if the value is ⅔ $E_v$ towards 1/125, the auxiliary indication members 15 and 16 are illuminated. It is assumed for the example described that the nominal value in box 12 is 250. It will be apparent that the same display format could be used for any of the exposure values.

As described above, the device according to the present invention has a small number of indication members for providing an indication of high precision. This allows a photographer to see the precise exposure values in an easy to read manner.

An embodiment of circuitry which actuates the indication is described hereinafter with reference to FIGS. 3 and 4. These figures will be described in detail in connection with the display of the Apex indication value $E_v$ (remembering that $E_v$ equals $B_v + 5$ for conventional usage). However, as will be pointed out subsequently, the same circuitry could be used for displaying $A_v$ or $T_v$, by simply substituting appropriate resistors normally present in any photometric camera circuit.

Figure 3:
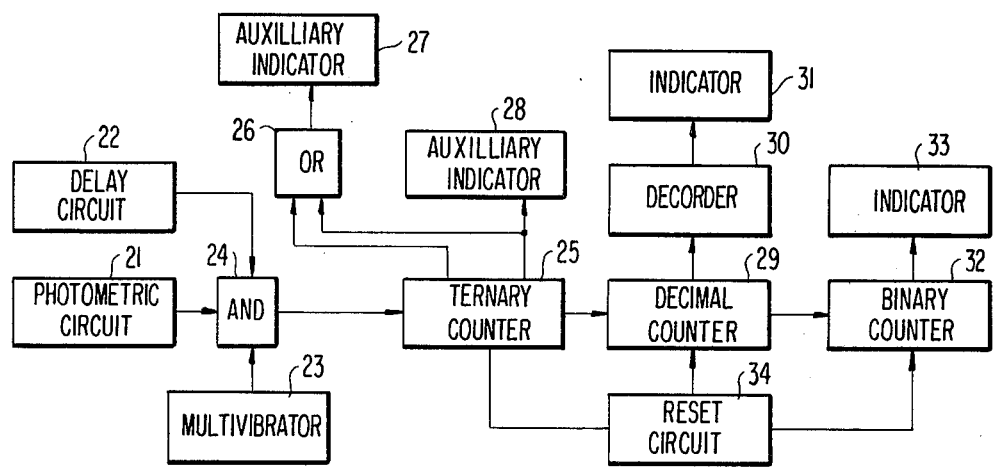
FIG. 3 is an electric circuit block diagram of the device according to the present invention.
Figure 4A:
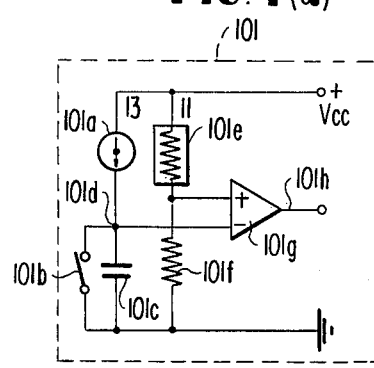
FIGS. 4(a) and (b) are parts of the circuit in FIG. 3 in detailed form.

In FIG. 3, there is shown a photometric circuit 21, the details of which may be designed as shown by circuit 101 in FIG. 4(a). A constant current source 101a and a capacitor 101c are arranged in series with a power source, +Vcc. A node 101d, between the constant current source 101a and the capacitor 101c is connected to the inversion input terminal of a comparator 101g composed of an operational amplifier. The node between a composite photoconductive cell 101e and a resistor 101f, also connected in series with the power source, is connected to the non-inversion input terminal of comparator 101g. A trigger switch is indicated at 101b.

Figure 4B:
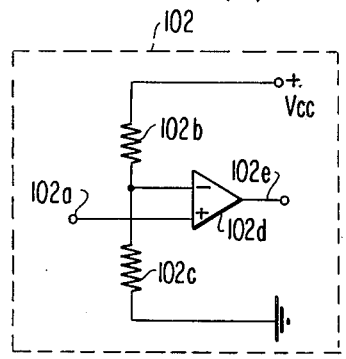

A delay circuit 22, shown in FIG. 3 may consist of a circuit 102 as shown in FIG. 4(b). In FIG. 4(b), a node between resistors 102b and 102c, arranged in series with the power source +Vcc, is connected to an inversion input terminal of comparator 102d composed of an operational amplifier. A terminal 102a is connected to the ion inversion input terminal of comparator 102d. The terminal 102a of the delay circuit is also connected to node 101d of the photometric circuit.

An AND circuit 24 receives an output from photometric circuit 21, delay circuit 22 and a pulse source, such as a mult-vibrator 23. The reference numeral 25 designates a ternary counter and 26 an OR circuit which receives each bit output of the ternary counter 25. The reference numerals 27 and 28 are auxiliary indicators which receive outputs of the ternary counter 25 and the OR circuit 26, respectively. The system also includes a decimal counter 29, a decoder 30 for driving a 7-segment indicator 31, a binary counter 32, an indicator 33 for indicating the numeral "1", and a reset circuit 34 for resetting the ternary counter 25, the decimal counter 29, and the binary counter 32.

With the construction as described, the device operates as follows: The light receiving element 101e in the photometric circuit 21 is the composite photoconductive cell, and the current $i_1$ through the cell 101e is proportional to the amount $B_v$ of Apex indication of the brightness B of an object, as is well known. Also as is well known, the value EV of Apex indication equals the sum of $B_v$ of Apex indication and $S_v$ of Apex indication ($S_v$ being film sensitivity). The relation between the current $i_1$ and the amount $B_v$ of Apex indication may be given as:

$$i_1 = i_o + i_2 (B_v) \quad (2)$$

where, $i_o$ is the current through composite photoconductive cell 101e at $B_v = 0 \equiv B_{vo}$, and $i_2$ is a proportional constant. $C_1$ represents the capacitance of the capacitor 101c, $i_3$ the current value of the constant current source 101a, and $R_1$ the resistance value of the resistor 101f. The voltage at the negative input of the operational amplifier is $V^-$. The voltage at the positive input of the operational amplifier is $V^+$. Initially, the switch 101b is closed. At this time, $$V^- = 0,$$

and $$V^+ = i_1 R_1.$$

The output at 101h will be positive.

When switch 101b closes, capacitor 101c begins charging, thereby increasing the voltage $V^-$ according to the equation;

$$V^- = \int \frac{i_3}{c} dt.$$

When $V^-$ reaches the value of $V^+$, the output at 101h drops to zero. The time, $t_1$, between the opening of switch 101b and dropping of the output 101h to a zero value, is determined by setting $V^-$ equal to $V^+$ and solving for $t_1$. Thus, $i_3 t_1/c = i_1 R_1$, therefore $$t_1 = \left(\frac{C_1 R_1}{i_3}\right) i_1 \quad (3)$$

In the delay circuit 102, resistor 102c has a value $R_1$ and resistor 102b has a value equal to that of photoconductor 101e at $B_{vo}$. Thus, the voltage at the inversion input node of 102d is $R_1 i_o$. The positive or non-inversion input of 102d is connected to node 101d of the photometric circuit. Thus, prior to opening switch 101b, the output at 102e is low or zero. The output will become positive (equivalent to binary 1) at a time $t_2$ following the opening of switch 101b when the voltage at node 101d equals $R_1 i_o$. Thus, the time $t_2$ is given as follows:

$$t_2 = \left(\frac{C_1 R_1}{i_3}\right) i_o \quad (4)$$

The only time that both output lines 101h and 102e are positive (i.e., binary 1's) is between $t_2$, when 102e goes positive, and $t_1$ when 101h goes to zero. Inasmuch as both outputs control AND gate 24, the latter is gated on to pass pulses from the multi-vibrator 23, for the period $t_o$, where, $$t_o = t_1 - t_2 = \left(\frac{i_2}{i_3} C_1 R_1\right) \cdot (B_v) \quad (5)$$

Since the value $$\left(\frac{i_2}{i_3} C_1 R_1\right)$$

is a constant, equation (5) may be rewritten as:

$$t_o = K_1 (B_v)$$

Thus, it is apparent that the time that AND gate 24 is closed to pass pulses from pulse source 23 is directly proportional to the $B_v$ value. If the period of multi-vibrator 23 is set at $\frac{1}{3} K_1$, then the number of pulses, N, passed through AND gate 24 to ternary counter 25 is given by the following equation:

$$N = 3 \cdot (B_v) \quad (6)$$

Reset circuit 34 is set to reset counters 25, 29 and 32 in synchronism with the closing of switch 101b for a new counting period.

It will now be apparent that counter 25 will receive three pulses for each $B_v$ value (stated otherwise, it receives one pulse for each $\frac{1}{3} B_v$ value) and provides an output pulse every third input pulse; counter 29 receives one input pulse for each one $B_v$ and provides an output pulse for every ten input pulses and counter 32 receives one input pulse if the $B_v$ value is above 10. The numbers of pulses applied to counters 29 and 32 are defined as N' and N", respectively, in the equations below:

$$N' = B_v \tag{7}$$

$$N'' = B_v/10 \tag{8}$$

Indicator 33 displays either a "1" or zero corresponding to the count in counter 33. Indicator 31 is a conventional seven segment indicator, e.g., seven LED segments or the like, and decoder 30 is a conventional decoder/segment driver for decoding the binary values 0 through 9 in counter 29 and energizing selected ones of the segments to display the value in counter 29 as a decimal digit. Indicators 27 and 28 may be simple illuminating devices which are illuminated when energized; 27 being illuminated when the binary value in counter 25 is either 10, or 01, and 28 being illuminated when the binary value in counter 25 is 10 (it will be noted that counter 25 does not reach the binary value 11 since it is only a ternary counter and counts the three values 00, 01, 10 and then recycles). To display the value $E_v$, rather than $B_v$, the decimal counter can simply be wired to as to start counting from a count of five rather than zero. Alternatively, the counter could be simply connected to the film sensitivity dial so as to cause a count corresponding to the Apex value of film sensitivity to be entered initially into the counter.

Thus, it is apparent that the indicators display the $E_v$ value to a precision of $\frac{1}{3}$ of the $E_v$ value, by providing a decimal indication of the nominal $E_v$ value and a further indication of additional $\frac{1}{3}$ and $\frac{2}{3}$ toward the next nominal $E_v$ value.

Table 1

| $E_v$ | 33 | 31 | 28 | 27 |
|---|---|---|---|---|
| 0 | 0 | 0 | | |
| 1/3 | | | | o |
| 2/3 | | | o | o |
| 1 | 0 | 1 | | |
| 1 . 1/3 | 0 | 1 | | o |
| 1 . 2/3 | 0 | 1 | o | o |
| 2 | 0 | 2 | | |
| 15 | 1 | 5 | | |
| 15 . 1/3 | 1 | 5 | | o |
| 15 . 2/3 | 1 | 5 | o | o |
| 16 | 1 | 6 | | | o indicates that the auxiliary indicator goes on.

As seen in Table 1, the $E_v$ values may be indicated by the main indicators 33 and 31 and the intermediate $\frac{1}{3} E_v$ and $\frac{2}{3} E_v$ by the auxiliary indicators 28 and 27.

The value $A_v$ can be displayed by simply replacing the photosensitive resistor 101e with a variable resistor that is controlled by the diaphragm ring. Resistors whose values respond to alteration of the diaphragm of aperture are common in photometric circuits. Alternatively, the values of $T_v$ can be displayed by substituting for resistor 101e a variable resistor whose value is determined by the shutter speed which is either set into the camera by the user or calculated by a photometric circuit. Such resistors are common in photometric circuits.

From the foregoing, it will be appreciated in the present invention that the exposure values may not only be indicated with extreme precision in the form of digits but also it is possible to visually perceive immediately if the required camera settings should be slightly advanced from the numerical values indicated on the main indication portion.

What is claimed is:

1. An exposure value visual indicating system in a camera having a viewfinder for viewing an image of a scene to be photographed, said system comprising:
   (a) electronic circuit means for generating a time period signal proportional to the exact Apex exposure value,
   (b) a source of clock pulses having a frequency selected to provide K clock pulses within a time period of said time window corresponding to one full Apex exposure value step, where K is a whole number greater than 1,
   (c) means responsive to said time period signal and said clock pulses to provide at an output thereof the clock pulses occurring during the duration of said time period,
   (d) counter means, including a divide-by-3 counter and a first divide-by-10 counter for separately counting the number of complete sets of three pulses at said output and the remaining pulses at said output, said divide-by-3 counter comprising a binary counter for counting the binary sequence 00, 01, 10, said binary counter being responsive to said pulse for counting from 0 to K−2, and providing an overflow pulse each time it recycles from K−1 to 0, said first divide-by-10 counter being responsive to said overflow pulses for counting from 0 to 9 and for providing ten's position overflow pulses when recycling from 9 to 0,
   (e) numerical display means, positioned to be seen through said viewfinder for displaying a numerical value depending upon the number of complete sets of K pulses counted by said counter means,
   (f) at least K−1 indicators, positioned to be seen through said viewfinder, and
   (g) means responsive to the number of remaining pulses counted by said binary counter for illuminating a set of said indicators to visually indicate the number of remaining pulses counted, said means for illuminating comprising a connection between the highest order bit position of said binary counter and one of said indicators for illuminating said indicator when said binary counter holds the binary value 10 therein, and an ORed connection between the lowest order bit position in said counter and another of said indicators for illuminating said another indicator when said binary counter holds either of the values 01 or 10.

2. The system of claim 1 wherein said numerical display means comprises at least one segmented single decimal digit display unit and decoder means responsive to the count in said divide by 10 counter to selectively illuminate segments of said segmented display unit to display a number.

3. The system of claim 2 wherein said electronic circuit means comprises,
   (a) photoconductor circuit means for developing a voltage dependent upon the photography $B_v$ value, (b) circuit means for developing a fixed voltage equal to that which would be developed by said photoconductor circuit means at $B_v = 0$, (c) time constant circuit means for generating a linearly increasing voltage, and (d) comparator means responsive to said latter three means for generating a gating signal having a duration equal to the time it takes said linearly increasing voltage to vary between said dependent voltage and fixed voltage.

4. The system of claim 3, whrein said comparator means comprises:

first comparisom means for providing an output signal when said photoconductor circuit voltage exceeds said time constant circuit voltage;

second comparison means for providing an output signal when said time constant circuit voltage exceeds said fixed voltage; and third comparison means for providing said gating signal when output signals are provided by both said first and second comparison means.

5. An exposure value visual indicating system in a camera having a viewfinder for viewing an image of a scene to be photographed, said system comprising:

(a) electronic circuit means for generating a time period signal proportional to the exact Apex exposure value, said electronic circuit means comprising a photoconductor circuit means for developing a voltage dependent upon the photography $B_v$ value, circuit means for developing a fixed voltage equal to that which would be developed by said photoconductor circuit means at $B_v=0$, time constant circuit means for generating a linearly increasing voltage and comparator means responsive to said latter three means for generating a gating signal having a duration equal to the time it takes said linearly increasing voltage to vary between said dependent voltage and fixed voltage, said comparator means comprising first comparison means for providing an output signal when said photoconductor circuit voltage exceeds said time constant circuit voltage, said comparison means for providing an output signal when said time constant voltage exceeds said fixed voltage and third comparison means for providing said gating signal when output signals are provided by both said first and second comparison means, (b) a source of clock pulses having frequency selected to provide K clock pulses within a time period of said time window corresponding to one full Apex exposure value step, where K is a whole number greater than 1, (c) means responsive to said time period signal and said clock pulses to provide at an output thereof the clock pulses occurring during the duration of said time period, (d) counter means for separately counting the number of complete sets of K pulses at said output and the remaining pulses at said output, (e) numerical display means, positioned to be seen through said viewfinder for displaying a numerical value depending upon the number of complete sets of K pulses counted by said counter means, (f) at least $K-1$ indicators, positioned to be seen through said viewfinder, and (g) means responsive to the number of remaining pulses counted by said counter for illuminating a set of said indicators to visually indicate the number of remaining pulses counted.

6. An exposure value visual indicating system in a camera having a viewfinder for viewing an image of a scene to be photographed, said system comprising:

(a) electronic circuit means for generating a time period signal proportional to the exact Apex exposure value, said electronic circuit means comprising a photoconductor circuit means for developing a voltage dependent upon the photography $A_v$ value, circuit means for developing a fixed voltage equal to that which would be developed by said photoconductor circuit means at $A_v=0$, time constant circuit means for generating a linearly increasing voltage and comparator means responsive to said latter three means for generating a gating signal having a duration equal to the time it takes said linearly increasing voltage to vary between said dependent voltage and fixed voltage, said comparator means comprising first comparison means for providing an output signal, when said photoconductor circuit voltage exceeds said time constant circuit voltage, said comparison means for providing an output signal when said time constant circuit voltage exceeds said fixed voltage and third comparison means for providing said gating signal when output signals are provided by both said first and second comparison means, (b) a source of clock pulses having frequency selected to provide K clock pulses within a time period of said time window corresponding to one full Apex exposure value step, where K is a whole number greater than 1, (c) means responsive to said time period signal and said clock pulses to provide at an output thereof the clock pulses occurring during the duration of said time period, (d) counter means for separately counting the number of complete sets of K pulses at said output and the remaining pulses at said output, (e) numerical display means, positioned to be seen through said viewfinder for displaying a numerical value depending upon the number of complete sets of K pulses counted by said counter means, (f) at least $K-1$ indicators, positioned to be seen through said viewfinder, and (g) means responsive to the number of remaining pulses counted by said counter for illuminating a set of said indicators to visually indicate the number of remaining pulses.

7. An exposure value visual indicating system in a camera having a viewfinder for viewing an image of a scene to be photographed, said system comprising:

(a) electronic circuit means for generating a time period signal proportional to the exact Apex exposure value, said electronic circuit means comprising a photoconductor circuit means for developing a voltage dependent upon the photography $T_v$ value, circuit means for developing a fixed voltage equal to that which would be developed by said photoconductor circuit means at $T_v=0$, time constant circuit means for generating a linearly increasing voltage and comparator means responsive to said latter three means for generating a gating signal having a duration equal to the time it takes said linearly increasing voltage to vary between said dependent voltage and fixed voltage, said comparator means comprising first comparison means for providing an output signal when said photoconductor circuit voltage exceeds said time constant circuit voltage, said comparison means for providing an output signal when said time constant circuit voltage exceeds said fixed voltage and third comparison means for providing said gating signal when output signals are provided by both said first and second comparison means, (b) a source of clock pulses having frequency selected to provide K clock pulses within a time period of said time window corresponding to one full Apex exposure value step, where K is a whole number greater than 1, (c) means responsive to said time period signal and said clock pulses to provide at an output thereof the clock pulses occurring during the duration of said time period, (d) counter means for separately counting the number of complete sets of K pulses at said output and the remaining pulses at said output, (e) numerical display means, positioned to be seen through said viewfinder for displaying a numerical value depending upon the number of complete sets of K pulses counted by said counter means, (f) at least K−1 indicators, positioned to be seen through said viewfinder, and (g) means responsive to the number of remaining pulses counted by said counter for illuminating a set of said indicators to visually indicate the number of remaining pulses counted.

* * * * *